United States Patent

[11] 3,580,383

[72] Inventor  Jurjen Van Der Wal
             LaMirada, Calif. (1819 Port Stirling Place,
             Newport Beach, Calif. 92660)
[21] Appl. No. 870,375
[22] Filed    Sept. 29, 1969
             Division of Ser. No. 703,224, Jan. 24, 1968.
[45] Patented May 25, 1971

[54] VARIABLE PITCH CHAIN ASSEMBLY
     45 Claims, 15 Drawing Figs.
[52] U.S. Cl. .................................................... 198/16,
                           104/20, 198/110, 198/181
[51] Int. Cl. ....................................................... B65b 9/12,
                           B65g 15/02, B65g 21/12
[50] Field of Search............................................ 198/16,
                           110, 34, 181; 104/20, 25

[56]            References Cited
             UNITED STATES PATENTS
1,557,368  10/1925  Kershaw........................ 198/110(X)

FOREIGN PATENTS
736,827   9/1955   Great Britain................ 198/110

*Primary Examiner*—Edward A. Sroka
*Attorney*—Sellers and Brace

ABSTRACT: A variable pitch chain link assembly adapted to be operated in tension from a single driving source. Different portions of the chain assembly travel simultaneously at different speeds varying as widely as six to one using a driving power source operating at uniform speed. Basically a single chain assembly suffices to practice the fundamental principles of the invention. A simple link chain is provided equipped with rigid arms projecting from the opposite sides thereof and each effective in cooperation with cam means confined to the related side of the chain to flex the chain linkage either in a direction to shorten or to lengthen the chain pitch depending upon the contour of the cam means. The rigid arms are so arranged as not to pivot across the plane of advance thereby permitting free access to the chain in this plane for connection of other equipment in a wide range of useful operating environments for the invention chain assembly.

PATENTED MAY 25 1971 3,580,383

INVENTOR.
JURJEN VAN DER WAL
BY
ATTORNEYS

VARIABLE PITCH CHAIN ASSEMBLY

This application is a division of my copending application for U.S. Letters Pat., Ser. No. 703,224 filed Jan. 24, 1968 entitled Conveyor System With Portions Operable At Different Speeds.

This invention relates to conveyors and transportation systems, and more particularly to a unique conveyor system featuring a belt constructed for expansion and contraction under conditions such that one or more portions travel at a rate greatly in excess of other portions thereby making it feasible to load and unload at a safe lower speed and to transport the load being handled to its destination at high speed.

One of the longstanding limitations governing the design and operation of conveyor systems has been the maximum operational speed safely tolerable during either loading or unloading. Once the load is safely aboard the conveyor, a higher speed is readily tolerated and desirable. Prior designs proposed to satisfy this condition have not provided satisfactory and practicable modes of achieving differential travel rates utilizing a simply constructed simply powered conveyor assembly avoiding the numerous problems associated with a variable speed conveyor.

It is possible and known to introduce time delay expedients in continuously operating conveyor systems effective to retard or speed up the operation of a limited portion of the conveyor within very narrow speed ranges. Examples of such expedients are to be found at return bends of certain known conveyors and applications where it is desirable to open up the space between load-carrying cradles or cages to avoid interference with one another when making turns or for related purposes. The achievable change in travel speed made possible by these prior expedients is usually confined to a small fraction of the normal speed and is customarily possible only over a relatively short travel path.

It has also been proposed to provide a conveyor linkage having extendable and contractable sections each provided with its own source of power but these are subject to serious and vexatious problems owing to the difficulty of synchronizing the operating speeds of the several power sources. Unless the motors are operated in perfect synchronism a portion of the conveyor downstream from one or more motors is subject to pushing forces whereas one or more upstream portions are under tensile forces with the result that alternate sections of the system are in compression and in tension, respectively.

Another serious problem associated with prior designs is the fact that the spacing between adjacent load-bearing members must vary as the speed changes. This introduces problems and presents hazards both to property and to persons in the vicinity of the equipment. In fact, such variable gaps in the load-bearing surface prohibits the use of the equipment to carry passengers because of the ever-present and serious risks to life and limb.

Still another serious defect of prior systems is the highly objectionable limitations on the speed differential heretofore achievable.

It is, therefore, a primary purpose of the present invention to avoid the foregoing and other serious limitations of prior variable speed transportation systems. By the present invention there is provided a simple conveyor system utilizing a stretchable conveyorlike belt comprising a simple rugged and proven main linkage assembly equipped with simple components and cam means cooperating to expand or contract the chain automatically while passing one or more loading and unloading stations. Any desired length of this belt can be operated in contracted condition while another portion of any desired length can be operated in extended condition and at a materially higher travel speed. The different rates of travel are achieved by continuously expanding a length of contracted conveyor at the desired high travel rate. For example, if the contracted portion is traveling at 2 miles per hour and a selected length of this contracted conveyor is expanded at the ratio of 6 to 1, the portion of the conveyor leaving the contracted portion is traveling at a speed equal to the product of its contracted speed and this ratio, or 12 miles per hour. The expanded portion continues to travel at this faster rate so long as additional sections of the contracted conveyor continue to be expanded under the same conditions and so long as the contracted sections of the conveyor are advanced into the expanding operation.

Since it is usually desirable to discharge the load at the slow loading speed, this objective is easily accomplished by reversing the expanding operation just described immediately in advance of the unloading station. In other words, the expansion operation is carried out in reverse by gradually collapsing the advance end of the high-speed section down to the desired discharge speed, as 5 miles per hour.

If it is desirable to operate the conveyor continuously, then the conveyor belt should be designed as a continuous loop and the collapsed sections are returned to the loading end of the conveyor. If there is need for carrying a return load at high speed, then this run is also provided with conveyor-expanding and conveyor-contracting facilities at the opposite ends of each high-speed section of the conveyor and adjacent respective loading and unloading stations.

A typical and illustrative application of the invention conveyor system is as a variable speed traveling sidewalk for pedestrian use. The sidewalk may be of any desired length and as many loading and unloading stations as is desired may be located along either or both runs of the system. Each loading or unloading station is provided with an associated contracting or expanding section in order that the sections of the conveyor passing the associated loading and unloading stations proper may travel at a safe operating speed for passengers entering and leaving the sidewalk. All remaining portions of the conveyor may be operated at a much higher speed, as two to six or more times faster than the slow sections. According to one arrangement of the invention power sidewalk, the entire sidewalk may be virtually at floor level with the return-bend portions carried by sprocket means operating on vertical axes and with the two runs of the conveyor located in closely spaced side-by-side relation and separated by a divider. Cover plates are employed over the slow moving sections at the loading and unloading stations and include suitable comb means for camming the load off the conveyor and onto this cover.

Typically, the conveyor proper may comprise overlapping and intermeshing load-carrying segments interconnected by a linkage assembly of any suitable design having provision for wide range extension and contraction lengthwise of the conveyor and operating under the control of suitable means for expanding or collapsing the linkage according to the particular operating needs.

The linkage assembly may comprise either a single or a multiple linkage assembly preferably but not necessarily arranged in closed endless loops and each consisting basically of a standard type roller link chain. Rigid arm means projecting from the opposite sides of adjacent links have their outer ends bearing against camming means along the slower moving sections of the system to control the expansion and contraction of the linkage while passing these zones. The arms are attached to the links in a manner permitting adjacent arms to internest to achieve maximum speed reduction while passing through the load transfer stations.

If a pair of endless chain assemblies are employed, then these may be arranged to support relatively long, narrow load-supporting members in such manner that the lateral edges of these members are substantially in engaging contact with one another throughout both the fast travel zones and throughout a major portion of the slow travel zones. This highly advantageous result is achieved by changing the relative speeds of travel of the two linkages asymmetrically, or in out-of-phase relationship, and by arranging the load-bearing members at an acute angle to the path of travel while passing through the fast travel zone. Appropriate means are employed to guide the linkage assemblies into and out of the slow travel zones in such manner as to maintain the load-bearing members in side-by-side relation as well as generally at right angles to the direction of travel. For this purpose the slow travel zones of the conveyors are generally U-shaped, each leg being sufficiently long to accommodate loading and unloading and the bight portion of the U being protected by a guard cover. The edges of this cover facing the U-legs are preferably provided with comb means cooperating with grooves extending crosswise of the load-bearing members to cam the load onto and off the conveyor.

Another feature of the invention is the use of a single prime mover for driving either a single or a multiple chain linkage from a single drive point. This is feasible in the present system because all parts of the conveyor linkage operate in tension.

Accordingly it is a primary object of this invention to provide a unique variable pitch chain linkage assembly.

Another object of the invention is the provision of a simple, rugged link chain assembly different portions of which are operable simultaneously at different speeds varying over a range as great as six to one.

Another object of the invention is the provision of a link chain assembly alternate links of which are equipped with rigid arms arranged to be pivoted toward and away from one another while passing cam means to either side of the path of advance thereby to vary the speed of different portions of the chain while being driven in tension from a uniform speed power source.

Another object of the invention is the provision of a link chain assembly equipped with laterally projecting arms cooperating with fixed cam means and operable to vary the speed of the chain by a ratio as high as six to one while pivoting said rigid arms through an arc not exceeding 90° and confined to a path to the lateral side of the path of advance.

These and other more specific objects will appear upon reading the following specification and claims and upon considering in connection therewith the attached drawings to which they relate.

Referring now to the drawings in which preferred embodiments of the invention are illustrated.

Figure 1:
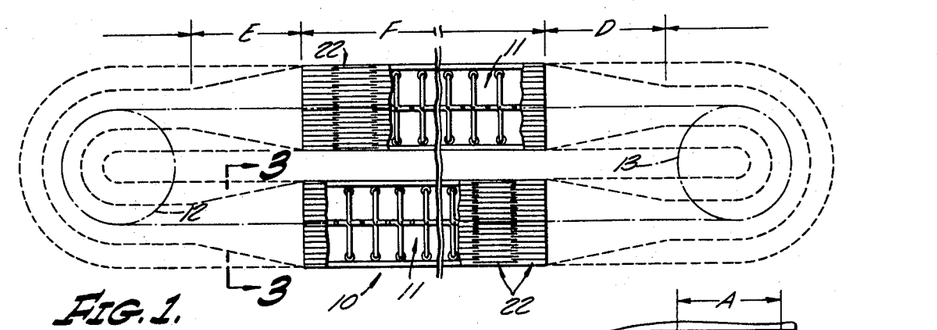
FIG. 1 is a generally schematic plan view of one preferred embodiment of the conveyor system with the major portion of its midsection broken away.
Figures 2, 3, 4, 5:
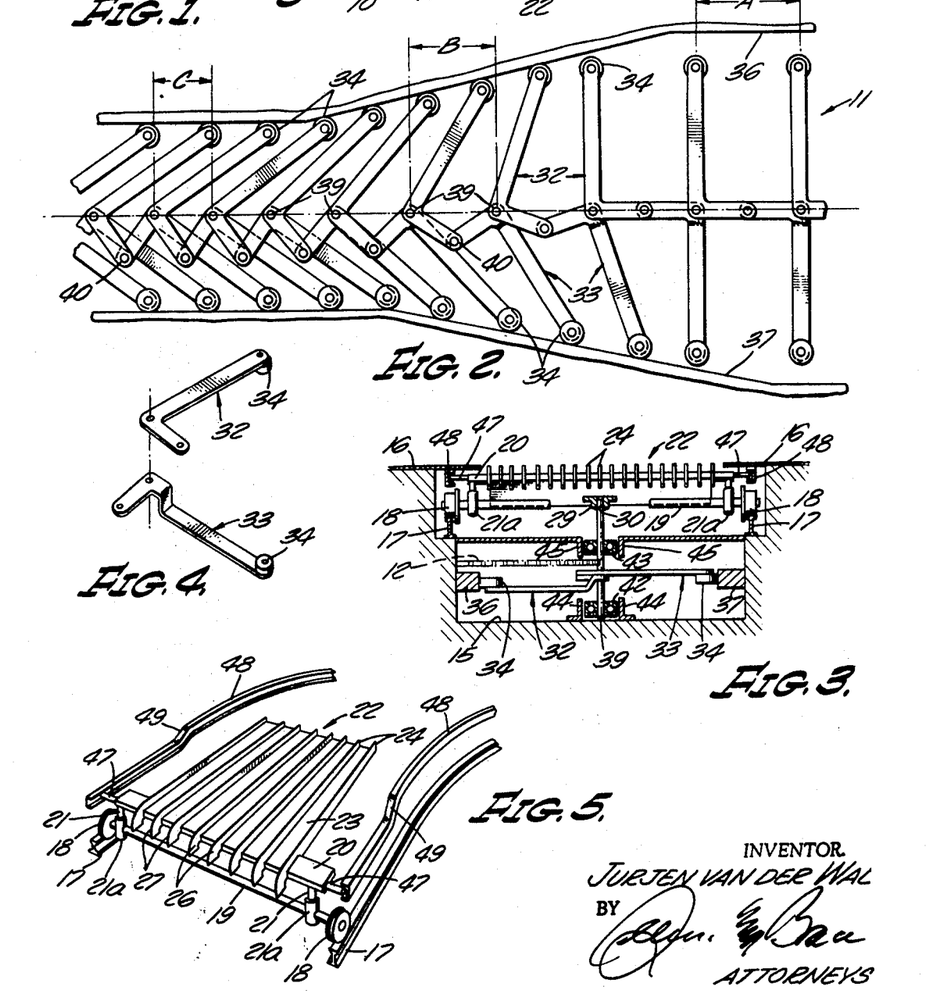
FIG. 2 is an enlarged fragmentary view of one of the conveyor expanding and contracting sections.
FIG. 3 is a cross-sectional view taken along line 3–3 on FIG. 1.
FIG. 4 is an exploded view of a pair of adjacent linkages forming part of the expandable contractable linkage assembly.
FIG. 5 is a fragmentary perspective view of a single conveyor segment and cam means for separating the segments while negotiating a return bend.

Referring initially more particularly to FIGS. 1 and 2, there is shown one preferred embodiment of the invention conveyor system, designated generally 10, having an expandable and contractable linkage 11 entrained over a pair of sprockets 12, 13 driven in synchronism and rotatable about vertical axles supported in suitable bearings, not shown. While the linkage there shown is endless and driven by a single prime mover, not shown, preferably operating at uniform speed, it will be understood that it could be constructed as a linear system operable for a short period in either direction and driven from its downstream end in each instance.

Conveyor 10 operates in a channel 15 (FIG. 3) with its top load-carrying surface generally flush with floor 16. Suitably supported along either side of channel 15 is a guide rail 17 supporting a multiplicity of flanged rollers 18 arranged in pairs at the opposite ends of supporting shafts 19. A U-shaped rigid stirrup member 20 carried by shaft 19 is attached to and supports a single one of the conveyor load-carrying segments 22.

As herein shown by way of example, segments 22 include a sheet metal panel 23 having a plurality of long thin fingers 24 projecting upwardly therefrom and arranged sufficiently close together as to support the load to be carried without risk of any portion of the load entering and becoming jammed between adjacent fingers. For example, if the conveyor is designed to transport pedestrians, then fingers 24 should be close enough to avoid having the heels of ladies' shoes enter between the fingers. However, the fingers must be spaced sufficiently to accommodate internesting of the fingers of an adjacent conveyor segment and to permit the segments to articulate horizontally relative to one another sufficiently to negotiate the return bend portions of the conveyor.

To aid in camming the load over the overlapping edges of adjacent segments 22 one end 26 of fingers 24 projects downwardly so as to embrace one transverse edge of plate 23 in the manner made clear by FIG. 5 with their lower end edges terminating in a generally horizontal plane closely spaced above the trailing end of the adjacent one of segments 22. The rounded upper edges 27 project above the upper edges of fingers 24 of the next adjacent segment in the manner made clear by FIG. 5 and act as a comb underlying the load carried by the conveyor and serving to shift this load to the slight extent necessary to permit lengthwise contraction and expansion of the overlapping ends of adjacent segments 22. Also to be noted from FIG. 5 is the fact one end of each segment is fixed to an inverted U-shaped member 20 having its vertically disposed legs 21 telescoped into tubes 21a welded to shaft 19. The other end of segment 22 rests on shaft 19 and beneath member 20 of the next adjacent segment 22. Secured to the underside of the central portion of the free end of each segment 22 is a journal member 29 having a well 30 the purpose of which will be explained more fully presently.

Referring to FIGS. 3 and 5 it is pointed out the segments 22 also preferably include means for camming the segments to separate fingers 24 of one segment from the comb ends 26 of an adjacent segment while negotiating the return bends thereby avoiding any possibility of damage to the fingers. To this end trunnions 47 projecting from the opposite ends of members 20 extend into channels 48 supported beneath the flooring overlying the segments at the return bend portions of the conveyor system. Along straight portions of the conveyor, channels 48 allow the comb ends 26 of the fingers to extend below the top edges of fingers 24 on the adjacent underlying one of segments 22. However, as the segments approach the return bends, trunnions 47 are cammed upwardly by camming portions 49, 49 formed in channels 48, 48 thereby elevating members 20 and legs 21 relative to tubular seats 21a. The resulting elevation disengages the combs 26 from between the fingers 24 of the underlying segment. Although not shown in FIG. 5, it will be understood that channels 48 are equipped with a second pair of cams similar to cams 49, 49 and positioned at the other end of the return bend and effective to lower the segments back to their normal operating level as they enter the straight run of the conveyor.

One suitable embodiment of linkage assembly 11 comprises a multiplicity of L-shaped links 32, 33 each including a relatively long leg and a relatively short leg lying generally at right angles to one another. At least one of the longer legs is desirably offset sufficiently to provide operating clearance for reasons self-evident from a consideration of FIGS. 2 and 3. The outer ends of the longer arms are each equipped with a cam follower roller 34 which, under certain operating conditions, are in contact with the faces of cam rails 36, 37 supported along either sidewall of channels 15. The spacing between the cam surfaces of rails 36 and 37 varies lengthwise of the conveyor and has important purposes, as will be explained presently.

The L-shaped linkage members 32, 33 have their junction portions arranged in overlapping relation and with their longer arms projecting in opposite directions to either side of the shorter legs, in the manner made clear by FIG. 2. The overlapped junctions of each pair of links are pivotally interconnected by a shaft 39 here shown as projecting vertically from the opposite sides of the linkage members. Split ring keepers or other suitable stop means, not shown, are applied to the midportions of shafts 39 on the remote faces of linkage members 32, 33 to hold them assembled in the midportion of the shafts. As will be observed from FIG. 2, the shorter legs of each pair of linkages 32, 33 also project in opposite directions lengthwise of the conveyor and their outer ends are pivotally connected by pins 40 to the similar ends of an adjacent linkage member.

Each shaft 39 extends downwardly from its links 32, 33, as shown in FIG. 3, and into the channel 15 where it carries a central bearing 43 and a bearing 42 at its end. Bearings 42 and 43 function as guide rollers for shaft 39 and make rolling contact with the adjacent sidewalls of guide channels 44 and 45 formed by brackets carried by walls of channel 15.

Referring now to FIGS. 1 and 2, it will be apparent that so long as the longer legs of linkage members 32, 33 are unrestrained, the application of driving tension from a suitable prime mover to the linkage assembly operates to pivot the shorter legs into alignment with one another longitudinally of the conveyor. The distance between adjacent shafts 39 is then at a maximum and is represented by the arrow A in FIG. 2. However, if the longer legs are pivoted in opposite directions about shafts 39, the shorter legs are likewise pivoted further from alignment causing the shafts to either side of one another to be spaced closer together, as is indicated by arrows B and C in FIG. 2. Further pivoting of the longer arm reduces the distance between shafts 39 and contracts conveyor segments 22 closer together lengthwise of the conveyor. The degree of expansion or contraction obtainable by this technique is dependent on the relative lengths of the shorter and longer arms of each linkage and the arcs through which the longer arms pivot. When fully expanded, the longer arms approach a position nearly normal to the path of travel. Using this linkage assembly, it is easily possible to operate portions of the conveyor with contraction and expansion ratios ranging between 1 to 2 and 1 to 4 or 5.

Control of expansion and contraction is achieved by cam members 36, 37 arranged along the path of cam follower rollers 34. In the arrangement depicted in FIG. 1 the return bend portions of the conveyor assembly operate with the load-carrying segments 22 contracted to a maximum degree. This is achieved by arranging the control cams 36, 37 in closely spaced parallel relation throughout those portions of the conveyor intended to operate in contracted condition. According to the arrangement shown in FIG. 1, cam guards 36, 37 diverge from one another lengthwise of zones D and E adjacent each return bend with the result that the major length of each run of the conveyor system operates extended and at maximum speed.

Each of the zones D and E constitute reversible contraction and expansion sections for the conveyor linkage 11 and the attached segments 22. Assuming that the conveyor is operating counterclockwise, as the upper run of the conveyor moves to the left, fully contracted segments 22 enter the smaller end of expansion zone D. Simultaneously, advance ones of the expanded segments from the high-speed zone F enter the wider inlet end of contraction zone E. Let it be assumed that the power supply, not shown, but understood as connected to main drive sprockets 12, 13 at the opposite ends of the conveyor system, is rotating these sprockets at a uniform rate of 5 miles per hour. Let it further be assumed that the contraction ratio of linkage assembly 11 is 2 to 1. From these assumptions it follows that all linkages entering the smaller inlet end of expansion zone D are traveling 5 miles per hour while those leaving the wider exit end of this zone will be going twice as fast, or 10 miles per hour. This result necessarily follows from the fact that the diverging cams 36, 37 permit links 32, 33 to pivot toward the aligned positions of their shorter legs. This movement expands the positions of segments 22 within zone D at a rate of 5 miles per hour which, added to the entrance rate of 5 miles per hour gives the segments an actual speed of 10 miles per hour as they leave the larger end of zone D.

The segments continue to travel at this uniform high speed throughout the length of the expanded section F since there is a continuous supply of segments traveling at this higher speed. As the linkages enter the wider end of contraction zone E, the longer arms are pivoted rearwardly thereby shortening the distance between adjacent shafts 39 and slowing the speed of the conveyor segments traversing zone E. At the exit end of this zone the segments are traveling at slow speed, or 5 miles per hour, and this is an appropriate location for an unloading station for either goods or pedestrians. Likewise, the portion of the conveyor immediately to the right of expansion zone D is a suitable location for a loading station.

It will be understood that the lower or return run of the conveyor illustrated in FIG. 1 is similarly equipped with associated pairs of loading and unloading stations as well as with pairs of conveyor contraction and expansion zones similar to those just described at D and E. It will likewise be understood that there may be numerous associated pairs of expansion and contraction zones along either run of the conveyor system and located at the opposite ends of a high-speed section. The length of the complete system is limited only by the strength of the materials, power requirements and other operating factors.

Although not shown, it will be understood that the return bend portions of the conveyor preferably operate beneath flooring when the system is used as a traveling sidewalk. The exit and entrance end edges of this flooring include suitable comb devices having fingers extending into the space between fingers 24 of the conveyor segments and are effective to cam the load or passengers off the conveyor and onto the flooring as the conveyor passes therebeneath. It is also desirable to provide a separating partition or guard between the two runs of the system.

It is also pointed out that the described expandable-contractable conveyor system is fully reversible and operates equally as well in both directions. This is quite evident from the fact that portions of the linkage assembly traversing the expansion-contraction zones D and E are always operating in opposite directions to one another. In other words, the portion of the linkage undergoing expansion in one zone is paired with another portion of the linkage downstream therefrom which is undergoing the reverse operation.

Figure 6:
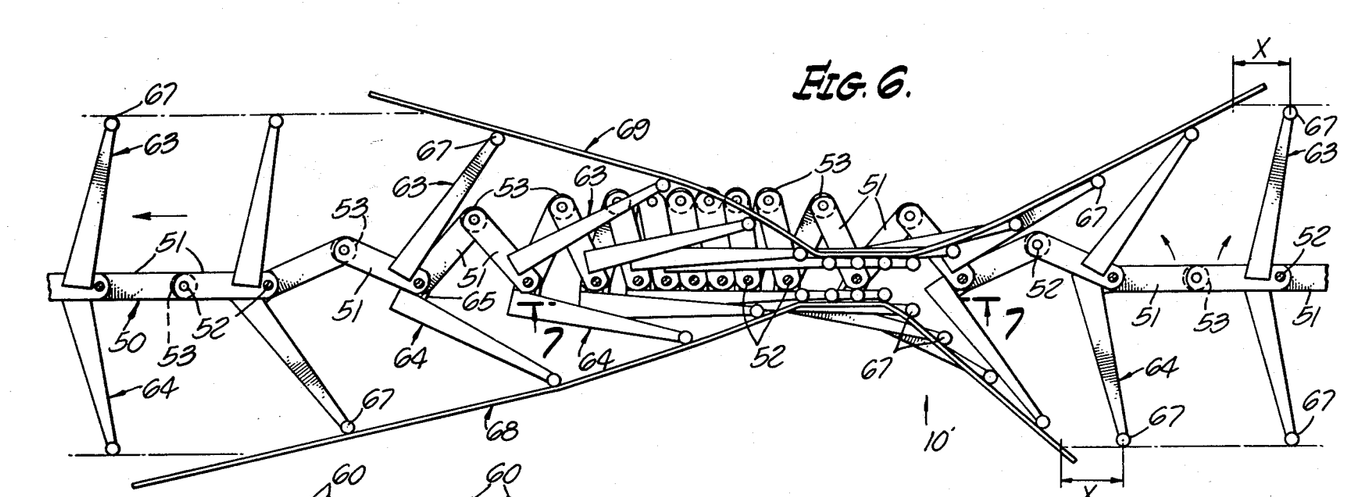
FIG. 6 is a fragmentary plan view of a second preferred embodiment of my stretchable chain linkage assembly showing the relationship of the components to one another while passing through a loading station.
Figure 7:
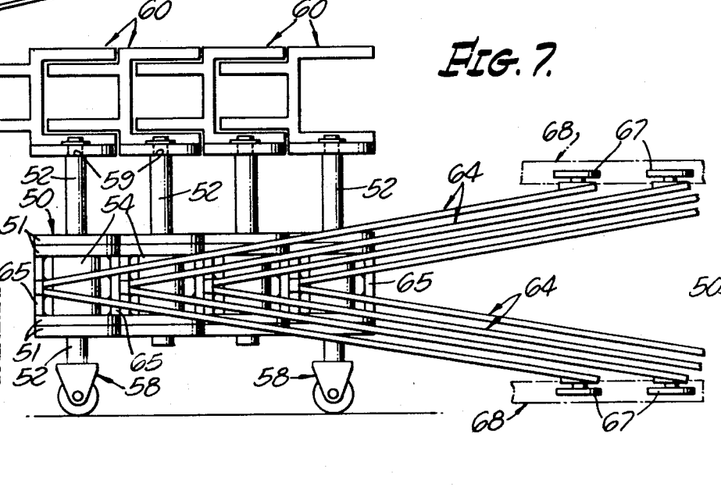
FIG. 7 is a fragmentary elevational view taken generally along line 7–7 on FIG. 6.
Figure 8:
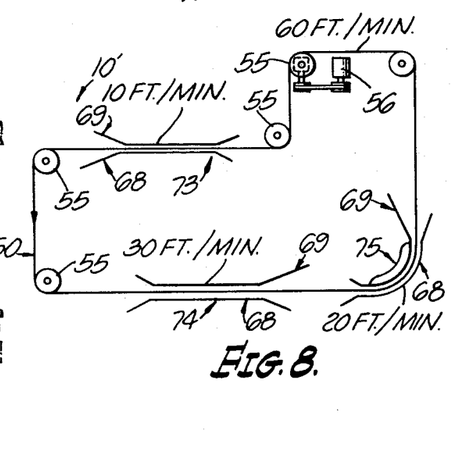
FIG. 8 is a simplified schematic showing one typical arrangement of a conveyor system employing the second embodiment of the stretchable chain linkage assembly with portions operating at typical different speeds while driven from a single prime mover operating at uniform speed.
Figures 9, 10, 11, 12, 13, 14, 15:
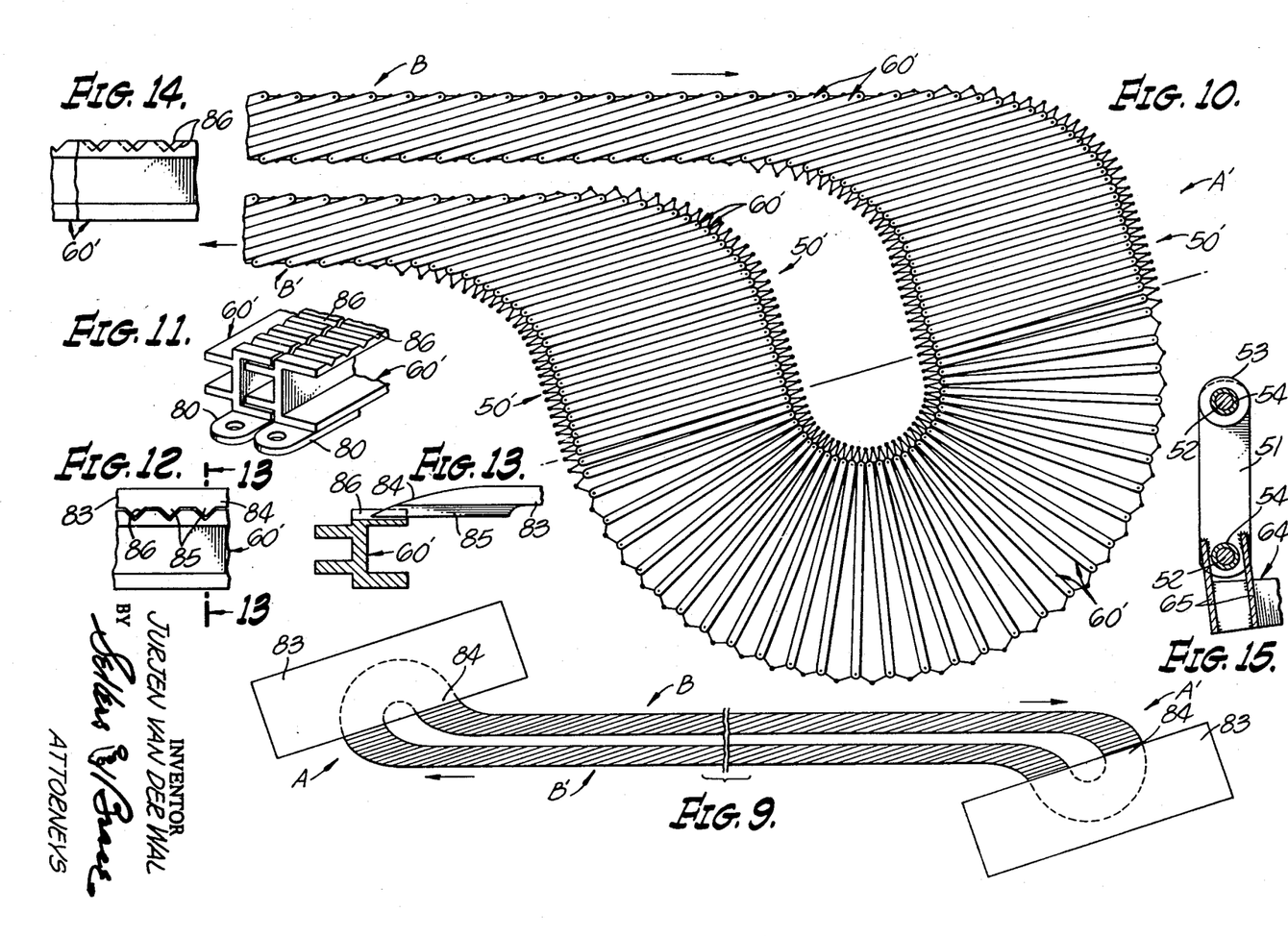
FIG. 9 is a schematic plan view of a third preferred embodiment of the invention and including a pair of loading and unloading stations.
FIG. 10 is a fragmentary plan view on an enlarged scale of the FIG. 9 embodiment showing one loading station with the cover for the return bend portion of the conveyor detached.
FIG. 11 is a fragmentary view in perspective of a pair of adjacent load-bearing members in the position occupied when passing through a loading station.
FIG. 12 is an elevational view as viewed from the left side of FIG. 13.
FIG. 13 is a vertical sectional view taken along line 13–13 on FIG. 12 and showing the comb provided between the moving conveyor and the fixed cover over the return bend of the loading station.
FIG. 14 is a view similar to FIG. 11 but showing the load-bearing members shifted lengthwise of one another for travel along a high-speed zone.
FIG. 15 is a fragmentary horizontal cross-sectional view on an enlarged scale through one of the chain links of the type used in the second and third embodiments.

A second preferred embodiment of the invention, designated generally 10′, is disclosed in FIGS. 6 to 8. The chain linkage assembly 50 includes a conventional type of roller chain comprising pairs of links 51 arranged in end-to-end relationship and pivotally interconnected at their overlapping ends. As is best shown in FIGS. 6 and 15, each pair of links is held in parallel spaced relation by spacing rollers, alternate ones 53 of which are of larger diameter than the intervening rollers 54. The larger diameter rollers 53 are engaged in known manner by a sprocket wheel 55 driven by a prime mover 56 (FIG. 8) which may and preferably does operate at uniform speed. It will be understood that the supporting guide rollers located at bends in the conveyor assembly may also comprise either sprocket or nonsprocket-type wheels.

Those alternate ones of the pivot pins passing through the smaller diameter rollers 54 project beyond the upper and lower sides of roller chain 50 in the manner best shown in FIG. 7, the lower ends of the pins being equipped with rollers and the upper shouldered ends 59 of the pin being shouldered and socketed in and supporting internesting load-supporting members 60 to be described in greater detail presently. Rollers 58 roll along a suitable supporting surface for the conveyor and serve to support the weight of the chain linkage assembly and any load present thereon.

The chain linkage assembly 50, as shown herein by way of example, is provided with rigid arm means for controlling the expanded and contracted condition of the assembly and comprises sets or pairs of rigid arms 63, 64 projecting from the opposite sides of the chain assembly. The inner ends of each set 63, 64 are secured to the chain closely adjacent to the alternate longer ones of the pivot pins 52. The arms comprising set 63, as herein shown, are secured, as by welding, to the exterior faces of one pair of links 51 whereas the pair of arms comprising set 64 are welded to a pair of members 65 (FIGS. 7, 15) straddling the small diameter roller 54 and pivot pin 52 and having their ends welded to an adjacent but separate pair of links 51 from the links to which arms 63 are welded.

The outer ends of each set of arms 63, 64 are provided with rollers 67 for engagement with stationary cam means designated generally 68, 69 suitably supported along either side of the path of travel of the conveyor linkage while passing through other than the fast travel zones. In general, camming surfaces 68, 69 are spaced equidistantly from the opposite sides of the intended path of travel of those pins 52 supporting the smaller diameter rollers 54. It will be understood that the contour of camming surfaces 68, 69 differ from one another in contour and that the two surfaces are staggered or asymmetrical relative to one another lengthwise of the conveyor whereby they cooperate to pivot adjacent pairs of chain links 51, 51 in the manner into and out of a sawtooth configuration as is best shown in FIG. 6. In this connection it will be observed and understood that the entrance and exit ends of the camming means flare in opposite directions and asymmetrically.

When the sets of arms 63, 64 are secured to the linkage assembly in the manner just described it is feasible to rotate the sets of arms 63, 64 through arcs of nearly 90° the extremes of which include the extended position shown at the opposite ends of FIG. 6 and the contracted position shown in the center of the FIG. 6 wherein the two sets of arms are in closely spaced parallel relation and the lateral edges of links 51, 51 are in substantial contact with one another. When the chain is contracted, the distance between pins 52 corresponds essentially to the width of links 51, whereas under maximum spacing conditions, the links are aligned in their outstretched condition for travel at high speed. If the ratio of the link length to width is 6 to 1, then it follows that the achievable variation in chain speed is in the ratio of 6 to 1. The slowest moving section of the chain is that portion folded or contracted to a maximum degree, as shown in the middle of FIG. 6, whereas the fast traveling section is any section having links in alignment or nearly so, as shown in the sections at the opposite ends of FIG. 6.

It is pointed out that the sets of arms 63, 64 pivot toward one another along the upstream end of the chain as the chain slows while approaching and entering a loading station, whereas the arms pivot away from one another toward their extended position while gaining speed when leaving a loading station. It will be understood that an advance set of arms 64 is controlled or synchronized to operate simultaneously with the adjacent trailing set of arms 63 while passing through a loading station. An understanding of this principle will be best understood by reference to the right-hand end of FIG. 6 wherein it will be noted that the outer ends of the upper right-hand set of arms 63 will contact camming means 69 after traveling the distance X and that the cooperating set of arms 64 will contact camming means 68 simultaneously after traveling the same distance X. It follows that arms 63 will function to pivot the attached pair of links 51 clockwise simultaneously as arms 64 act to pivot the attached set of links 51 counterclockwise. The importance of having the cam surfaces 68, 69 properly positioned to pivot these two intervening pairs of links 51, 51 in opposite directions simultaneously will be readily appreciated.

Referring now to FIG. 8, there is shown one of the many possible arrangements of the invention variable speed conveyor system arranged in a single closed loop chain link assembly 50. As there shown, the conveyor includes three loading stations 73, 74 and 75 past each of which the conveyor operates at a different speed. Thus, the camming means 68, 69 for the respective loading stations are spaced a minimum distance apart at station 73 with the result that the chain passes through the midportion of this station at the rate of 10 feet per minute whereas the midportions of camming means 68, 69 are spaced a greater distance apart at station 74 with the result that the conveyor passes through this station at a minimum speed of 30 feet per minute. At station 75 the camming surfaces 68, 69 are arranged along a curved path with their midportions spaced to provide a minimum speed through this station of 20 feet per minute.

Referring now to FIG. 7, it is pointed out that the typical load-supporting members 60 there shown are of modified H-shape in cross section with lateral pairs of edges spaced to internest with the more widely spaced opposite lateral edge of an adjacent member. If these members are operatively connected to a single chain linkage assembly, this connection is provided between the upper ends of a chain pivot pin 52 and a bracket associated with the midlength of an associated member 60. The opposite ends of the load-bearing members may operate within suitable guide channels, as channels 48, 48 shown in FIG. 5. Alternatively, the upper ends of pins 52 may be Y-shaped with each end of a Y arm connected to a single load-bearing member 60 to either side of its midlength.

The operation of the second preferred embodiment will be readily apparent from the foregoing detailed description of its components and is generally similar to the operation of the first described embodiment. Thus, portions of the conveyor linkage assembly located between loading stations operates at high speed, as 60 feet per minute, with all links in alignment and the pivot pin 52 spaced a maximum distance apart.

Referring to FIG. 8, it will be readily recognized that as the linkage enters station 73 the sets of arms 63, 64 engage camming surfaces 68, 69 causing the linkage to contract into the saw-toothed pattern shown in FIG. 6 thereby causing this portion of the assembly to slow down. Since the midportion of the cam surfaces 68, 69 are spaced a minimum distance apart, the conveyor travels at the minimum speed of 10 feet per minute while loading and unloading at station 73. Portions of the chain entering the flaring exit end of this station gradually accelerate and regain speed back to a speed of 60 feet per minute, the rotational speed at which the single driven sprocket 55 is operating. The chain continues to operate at this fast travel rate until approaching loading station 74. There, the chain decelerates while entering the left-hand end of the camming surfaces 68, 69 but, since the midportions of the camming surfaces at station 74 are spaced further apart than at station 73, the minimum speed of travel through this station is 30 feet per minute. The conveyor again accelerates to its maximum speed as it leaves station 74. Since the midportion of the camming surfaces 68, 69 at station 75 are spaced apart a distance intermediate the spacing at stations 73 and 74, the minimum travel speed at this station is 20 feet per minute. It is pointed out that owing to the flaring disposition of the pair of arms comprising each set 63, 64, the adjacent arms of each set are adapted to nest fully with one another in a manner made clear by FIGS. 6 and 7 when the conveyor is operating at its slowest speed.

Referring now to FIGS. 10 to 15, there is shown a third preferred embodiment of the invention utilizing a pair of the chain linkage assemblies, herein designated 50', as described above in connection with the second embodiment. Although not shown, it will be understood that camming means 68, 69 are supported along either side of each linkage assembly 50' at each loading and unloading station.

The closed loop conveyor system shown in FIG. 9 by way of illustrative example includes slow travel sections A, A' connected by intermediate fast travel sections B, B'. Chain assemblies 50' are supported in relatively closely spaced parallel paths along the high-speed section B, B' but flare into widely spaced parallel relation at the loading and unloading stations and having the general configuration best shown in FIG. 10. Each loading and unloading station of the conveyor may be appropriately described as generally U-shape in configuration with the legs of the U lying parallel to one another and at an obtuse angle to the length of the related high-speed sections B, B'.

The two chain linkages cooperate in supporting the adjacent ends of the long, narrow, closely spaced load-supporting members 60'. Each of these members is provided with brackets 80 at its ends having holes insertable over the upper ends of the pivot pins 52 interconnecting the links 51 of the roller chain assemblies. Members 60' remain parallel to one another throughout the length of the conveyor except while negotiating the return bend or bight of each U-shaped portion of the conveyor. During transit of this return bend, members 60' fan out from their adjacent inner ends in the manner clearly illustrated in FIG. 10; throughout all other portions of their travel, members 60' remain immediately adjacent and parallel to one another. Also to be observed from FIG. 10 is the fact that when traveling at high-speed members 60' have their ends arranged in echelon. As these members enter and leave the slow travel zones, they shift lengthwise of one another and out of echelon while retaining their closely spaced parallel relationship. Thus when traveling at minimum speed, their ends are even with one another. Whereas, when traveling at other than slow speed, their ends are in echelon. Another characteristic aspect of this embodiment is the fact that the load-supporting surface of the conveyor is relatively narrow along its high-speed portions and relatively wide along its slow-speed zones. The inner ends of members 60 continue to travel at slow speed while negotiating the return bend portion of the conveyor whereas the outer ends spread apart and travel at relatively high speed for reasons clearly apparent from FIG. 10.

If the conveyor is employed to handle a load likely to be caught between members 60' then it is desirable that the return bend portion of the conveyor be protected by a cover such as that indicated at 83 to avoid the possibility of passengers or cargo becoming caught between the edge of a member 60 and cover 83. The latter includes a comb comprising fingers 85 projecting downwardly from its underside of V-shape in cross section and extending downwardly into the complementally shaped V-shaped grooves 86 formed crosswise of the upper surface of the load-supporting members 60'. The upper surface of cover 83 is beveled as indicated at 84 to facilitate transfer of a load between members 60 and cover 83. Grooves 86 are aligned while members 60 are passing through the slow-speed zone but may be and usually are misaligned while passing from the slow-speed into the high-speed zone. This misalignment condition is illustrated in FIG. 14 whereas the aligned condition is shown in FIGS. 11 and 12.

Each of the two chain linkage assemblies is suitably supported by rollers from beneath in the manner described in connection with FIG. 7 and by suitable means, such as cog wheels or guide shoes at the entrances and exits of the loading stations. It will be understood that the slow-speed zone along the parallel legs of the loading and unloading stations are sufficiently long for the transfer of either cargo or pedestrian traffic to and from the conveyor. As will be apparent, the slow moving section of one leg of the U-shaped portions serves as an unloading station whereas the corresponding portion of the other leg serves as the loading station.

As in the two previously described embodiments the third embodiment is preferably driven by a single prime mover connected to drive the two conveyor chains in unison, as for example from cog wheels mounted on a common shaft. These cog wheels are designed to engage and seat the large diameter rollers 53 of the respective chain assembly. The prime mover can be located either at a slow or high-speed section of the conveyor.

The operation of the third embodiment will be quite apparent from the foregoing description of the components and their operative relationship to one another. This species features a simple arrangement of load-carrying members arranged in closely spaced side-by-side relation and capable of lengthwise relative movement without variation in the spacing therebetween. The arrangement therefore is characterized by an unusually high safety factor in that there is substantially no opportunity for cargo or pedestrian traffic becoming engaged in or pinched between the load-bearing members, and this is true even though the chain assembly stretches and contracts over a wide range. The load-bearing members cooperate in providing a substantially gapless, continuous level surface through the slow and high-speed zones. The only time that the spacing between these members varies is while they are negotiating a return bend, an operation which is preferably carried out beneath an overlying cover and with the load out of contact with the moving conveyor.

Throughout the fast travel zone the load-bearing members lie at an acute angle to the length of the two chain assemblies underlying and connected to the load-bearing members. As the members approach a loading station, the two chains supporting the load-bearing members are routed into a slow-speed path lying at an obtuse angle to the high-speed travel path but remain in their same closely spaced parallel positions.

While the particular conveyor system with portions operable at different speeds herein shown and disclosed in detail is fully capable of attaining the objects and providing the advantages hereinbefore stated, it is to be understood that it is merely illustrative of the presently preferred embodiments of the invention.

I claim:

1. A link chain assembly for use under tension in moving a load along a path including a slow travel zone and a fast travel zone arranged in end-to-end relation and which chain assembly has the capability of changing the effective length of portions thereof automatically and progressively while moving continuously under tension past the adjacent ends of said slow and fast zones, said chain assembly comprising a multiplicity of links movably connected together, pairs of lever arms means connected one to each of adjacent links of said chain assembly for pivotal movement about a common pivot axis, and each of said lever arm means having an outer free end equipped with cam follower means adapted to engage cam means for pivoting said lever arm means and the link secured thereto in opposite directions about said common pivot axis to change the effective pitch of the adjacent portion of said chain and thereby the rate of travel of the portion experiencing the changes in length.

2. A link chain assembly as defined in claim 1 characterized in that said lever arm means is connected to the associated link closely adjacent one end thereof.

3. A link chain assembly as defined in claim 2 characterized in that said lever arm means are arranged to pivot through arcs not in excess of 90° between a collapsed position closely spaced from and substantially parallel to the longitudinal centerline of the path of travel of said chain and an extended position of said lever arm means generally normal to said path of travel.

4. A link chain assembly as defined in claim 1 characterized in that each lever arm means of a pair thereof is arranged to pivot substantially in unison and in opposite directions toward and away from a respective side of the path of travel of said chain assembly.

5. A link chain assembly as defined in claim 1 characterized in that the lever arm means of each pair thereof project away from the opposite lateral sides of said chain links.

6. A link chain assembly as defined in claim 1 characterized in that said lever arm means are fixed to one end of the associated one of said links and constitute an extension thereof effective to pivot the link about said common pivot axis located closely adjacent the junction of the lever arm means and said link.

7. A link chain assembly as defined in claim 1 characterized in that the cam follower means on adjacent ones of said lever arm means are located on the opposite sides of said links and move in arcuate paths toward and away from said links as the effective pitch of said link chain assembly changes.

8. A link chain assembly as defined in claim 7 characterized in that said cam follower means comprise roller means journaled to the outer free ends of said lever arm means and which roller means are adapted to roll against camming means spaced varying distances from the path of travel of alternate ones of the movable connections between said elongated links.

9. A link chain assembly as defined in claim 1 characterized in that said links are pivotally connected together by pivot pin means, the axes of alternate ones of which are coincident with the common pivot axes of said pairs of lever arm means.

10. A link chain assembly as defined in claim 1 characterized in that said links each include a first pair of strips arranged in spaced apart parallel relation and interconnected by pair of pivot pin and roller assemblies, a respective one of said pair of pivot pin and roller assemblies serving to connect said first pair of strips pivotally to an adjacent pair of said strips.

11. A link chain assembly as defined in claim 9 characterized in that one end of said pivot pin means coincident with the common pivot axes of said pairs of lever arm means projects axially beyond one lateral side of said chain assembly and is adapted to be operatively connected to load-supporting means movable with said chain assembly.

12. A link chain assembly as defined in claim 1 characterized in that the length of said lever arm means extends generally at right angles to the length of the associated link.

13. A link chain assembly as defined in claim 12 characterized in that the main bodies of said lever arm means are positioned to internest as the same pivot toward one another while passing along said slow travel zone.

14. A link chain assembly as defined in claim 1 characterized in that said cam means converge in passing between one adjacent set of merging ends between fast and slow zones of travel and diverge in passing between the next adjacent set of merging ends between fast and slow zones of travel.

15. A link chain assembly as defined in claim 11 characterized in that said pivot pin means having axes in common with the associated pair of lever arm means remain in general alignment with the draft forces acting lengthwise of said chain assembly as it advances along its path of travel through said slow and fast zones, and intervening ones of said pivot pin means moving laterally toward and away from a line passing through said first-mentioned pivot pin means.

16. A link chain assembly as defined in claim 15 characterized in that said lever arm means are fixed to said links closely adjacent and immediately in advance of the associated ones of said pivot pin means and are positioned to nest together closely against the opposite sides thereof while passing through said slow travel zone.

17. A link chain assembly as defined in claim 16 characterized in that said lever arm means are positioned to pivot rearwardly toward the opposite sides of trailing portions of said chain assembly while passing from a fast travel zone into a slow travel zone.

18. A link chain assembly as defined in claim 17 characterized in that said lever arm means include a pair of lever arms fixed to a respective one of said links and diverging from one another.

19. A link chain assembly as defined in claim 18 characterized in that the outer free ends of each of said lever arms are provided with cam follower roller means each adapted to contact camming means cooperating therewith to control the pitch of the particular links of said chain assembly to which said lever arms are fixed.

20. A link chain assembly as defined in claim 16 characterized in that adjacent ones of said lever arm means are fixed to respective links closely adjacent the ends thereof movably connected together, and said adjacent ones of said lever arm means acting to pivot said respective links in opposite directions about the movable connection between their adjacent ends as said chain assembly passes through said slow travel zone.

21. A link chain assembly as defined in claim 18 characterized in that the ends of said pairs of adjacent lever arm means overlap and internest as said pairs of lever arm means pivot toward one another and approach the opposite sides of trailing portions of said chain assembly.

22. A link chain assembly as defined in claim 21 characterized in that the ends of said pairs of adjacent lever arm means move out of overlapping internesting positions as their outer free ends pivot away from one another and as the associated links of said chain speed up while leaving a slow rate travel zone.

23. A link chain assembly as defined in claim 1 characterized in the provision of rolling support means along the lower side of said chain assembly.

24. A link chain assembly as defined in claim 1 characterized in the provision of pivot pin means coupling adjacent ends of said links together to form a chain assembly freely flexible in a first plane extending crosswise of said links and which is relatively nonflexible in a second plane normal to said first plane and extending lengthwise of said links, and camming means extending along the opposite sides of said slow travel zones positioned to hold alternate ones of said pivot pin means aligned with the path along which the draft forces are applied to drive said chain assembly and the remaining alternate ones of said pivot pin means being movable along a compound curvate path while passing through said slow travel zone.

25. A link chain assembly as defined in claim 24 characterized in that the midportions of said camming means extending along said slow travel zone are generally parallel to one another and in that the portions of said camming means to either end of said midportions are inclined in opposite directions with respect to the path along which said draft forces are applied.

26. A link chain assembly as defined in claim 25 characterized in the provision of a multiplicity of individual load-supporting members cooperating to provide a generally level load-supporting surface closely overlying said chain assembly, and means providing a draft connection between individual ones of said load-carrying means and a respective one of said pivot pin means having axes common to said pivoting lever arm means.

27. A link chain assembly as defined in claim 25 characterized in that the inclined portions of said camming means at the opposite ends of said slow travel zone flare in a direction opposite the direction of flare at the other end.

28. A link chain assembly as defined in claim 27 characterized in that the portions of said camming means at the opposite ends of said slow travel zones flare in opposite directions and asymmetrically.

29. A link chain assembly as defined in claim 1 characterized in that said camming means at the opposite ends of said slow travel zones flare in opposite directions and asymmetrically.

30. A link chain assembly as defined in claim 1 characterized in that said camming means along either side of said chain assembly at said slow travel zones has different portions thereof spaced different distances from the line of the draft forces applied to said chain assembly and the camming means on one side of said chain assembly being asymmetrical with respect to the camming means on the other side thereof.

31. A conveyor system comprising a power propelled chain of links movably connected together for operation in continuous tension and having one portion of its length contracted with individual parts of links therealong arranged in short-pitch V-formation and another portion of its length stretched so that the links of said individual pairs are arranged in relatively longipitch generally aligned relation lengthwise of the path of travel, and arm means rigidly attached to said pairs of links and projecting from the opposite sides of said chain and positioned to engage camming means positioned along either side of said chain and cooperating with said arm means to vary the angular positions of the links comprising each of said pair as said chain is advanced along its path of travel, whereby the links of said chain in stretched long-pitch condition travel at a rate which is substantially higher than the travel rate of the links contracted into short-pitch V-formation.

32. A conveyor system arranged along a path of travel and including a slow travel zone and a fast travel zone, said system comprising a power driven link chain assembly movably connected together and supported for movement through said slow and fast zones in sequence with all parts thereof operating under tension, camming means supported along the opposite sides of said chain with its camming surfaces spaced apart differently along different portions of the length of said chain, and lever arm means operatively associated with said links including cam follower means at the outer ends with successive ones thereof positioned to engage alternate ones of said camming means and cooperating therewith to move adjacent pairs of chain links into a relatively short-pitch, more compact arrangement to slow the rate of travel thereof while passing through said slow travel zone and into a substantially long-pitch, stretched arrangement to increase their rate of travel while passing through said fast travel zone, and work performing means operatively connected to and movable with said link chain assembly as the same is driven through said slow and fast travel zones.

33. A conveyor system as defined in claim 32 characterized in that said link chain assembly comprises an endless loop, a plurality of rotary wheel means for holding said link chain assembly outstretched, and driving means for driving said conveyor system.

34. A conveyor system as defined in claim 33 characterized in that said driving means is operable normally at uniform speed.

35. A conveyor system as defined in claim 34 characterized in that said driving means is connected to said link chain assembly at a single drive station.

36. A conveyor system as defined in claim 32 characterized in that said system includes a pair of similar link chain assemblies cooperating to support said load-carrying means while advancing it from place to place along the path of travel.

37. A conveyor system as defined in claim 36 characterized in the provision of a multiplicity of rolling means for supporting each of said link chain assemblies.

38. A conveyor system as defined in claim 33 characterized in the provision of not less than two slow travel zones separated by at least one fast travel zone.

39. A conveyor system as defined in claim 38 characterized in the provision of a plurality of fast travel zones separated from one another by intervening slow travel zones.

40. A conveyor system as defined in claim 39 characterized by the provision of a single uniform-speed prime mover for said link chain assembly.

41. A link chain assembly as defined in claim 1 characterized in that the links thereof have equal pitch.

42. A link chain assembly as defined in claim 41 characterized in that the said assembly is contracted to a pitch wherein the adjacent edges of alternate links are substantially parallel to one another.

43. A linkage assembly for use in a variable pitch chain having separate portions thereof adapted to travel at different rates of speed, said linkage assembly comprising a plurality of links arranged with the adjacent ends thereof in overlapping movably connected relationship to form a flexible chain, and means secured to said links at the adjacent ends of successive pairs of links and projecting from the opposite sides thereof for use in causing adjacent ones of said links to pivot in opposite directions as said linkage assembly is propelled under tension from end to end thereof thereby causing said linkage assembly to change in pitch and in the rate of travel of said pivoting links relative to other links of said linkage assembly.

44. A linkage assembly as defined in claim 43 characterized in that said links are generally L-shaped and in that the junction areas of their respective pairs of legs are pivotally connected together with the legs of each extending generally in opposite directions when the assembly is stretched toward its maximum pitch, and pivot means interconnecting the overlapped ends of the legs of adjacent ones of said L-shaped links.

45. A linkage assembly as defined in claim 2 characterized in that the legs of said links projecting outwardly from the opposite sides of said linkage assembly lie in planes inclined acutely away from a common plane extending transversely of said linkage assembly and sufficiently to permit said legs to be moved into internesting relationship as said linkage assembly is shortened to slow the rate of travel of said shortened portion.